United States Patent
Fan et al.

(10) Patent No.: US 9,518,236 B2
(45) Date of Patent: Dec. 13, 2016

(54) SYNTHETIC FUELS AND CHEMICALS PRODUCTION WITH IN-SITU $CO_2$ CAPTURE

(75) Inventors: Liang-Shih Fan, Columbus, OH (US); Fanxing Li, Columbus, OH (US); Liang Zeng, Columbus, OH (US)

(73) Assignee: THE OHIO STATE UNIVERSITY RESEARCH FOUNDATION, Columbus, OH (US)

( * ) Notice: Subject to any disclaimer, the term of this patent is extended or adjusted under 35 U.S.C. 154(b) by 788 days.

(21) Appl. No.: 13/394,396

(22) PCT Filed: Sep. 8, 2010

(86) PCT No.: PCT/US2010/048121
§ 371 (c)(1),
(2), (4) Date: Mar. 6, 2012

(87) PCT Pub. No.: WO2011/031752
PCT Pub. Date: Mar. 17, 2011

(65) Prior Publication Data
US 2012/0159841 A1  Jun. 28, 2012

Related U.S. Application Data

(60) Provisional application No. 61/240,446, filed on Sep. 8, 2009.

(51) Int. Cl.
*C10L 1/12* (2006.01)
*C10J 3/72* (2006.01)
(Continued)

(52) U.S. Cl.
CPC .................. *C10J 3/725* (2013.01); *C10G 2/50* (2013.01); *C10G 2300/1011* (2013.01);
(Continued)

(58) Field of Classification Search
CPC ................... C10J 2300/0916; C10J 2300/093; C10J 2300/0959; C10J 2300/1612; C10J 2300/1659; C10J 2300/1678; C10J 2300/1807; C10J 3/466; C10J 3/725; C10J 3/86; C10K 1/003; C10K 1/024; C10G 2300/1011; C10G 2300/807; C10G 2/50; Y02P 20/145; Y02P 30/20
(Continued)

(56) References Cited

U.S. PATENT DOCUMENTS

| 971,206 A | 9/1910 | Messerschmitt |
| 1,078,686 A | 11/1913 | Lane |
(Continued)

FOREIGN PATENT DOCUMENTS

| CN | 101389734 A | 3/2009 |
| CN | 101426885 A | 5/2009 |
(Continued)

OTHER PUBLICATIONS

Fan et al., "Utilization of chemical looping strategy in coal gasification processes", Particuology 6, 2008, U.S., pp. 131-142.
(Continued)

*Primary Examiner* — Latosha Hines
(74) *Attorney, Agent, or Firm* — Michael Best & Friedrich LLP

(57) ABSTRACT

Novel redox based systems for fuel and chemical production with in-situ $CO_2$ capture are provided. A redox system using one or more chemical intermediates is utilized in conjunction with liquid fuel generation via indirect Fischer-Tropsch synthesis, direct hydrogenation, or pyrolysis. The redox system is used to generate a hydrogen rich stream and/or $CO_2$ and/or heat for liquid fuel and chemical production. A
(Continued)

portion of the byproduct fuels and/or steam from liquid fuel and chemical synthesis is used as part of the feedstock for the redox system.

8 Claims, 10 Drawing Sheets

(51) Int. Cl.
  *C10G 2/00* (2006.01)
  *C10J 3/46* (2006.01)
  *C10J 3/86* (2006.01)
  *C10K 1/00* (2006.01)
  *C10K 1/02* (2006.01)

(52) U.S. Cl.
  CPC ......... *C10G 2300/807* (2013.01); *C10J 3/466* (2013.01); *C10J 3/86* (2013.01); *C10J 2300/093* (2013.01); *C10J 2300/0916* (2013.01); *C10J 2300/0959* (2013.01); *C10J 2300/1612* (2013.01); *C10J 2300/1659* (2013.01); *C10J 2300/1678* (2013.01); *C10J 2300/1807* (2013.01); *C10K 1/003* (2013.01); *C10K 1/024* (2013.01); *Y02P 20/145* (2015.11); *Y02P 30/20* (2015.11)

(58) Field of Classification Search
  USPC ............................................ 44/457; 518/700
  See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,108,732 A | 8/1978 | Nuttall, Jr. |
| 4,272,399 A | 6/1981 | Davis et al. |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 6,007,699 A | 12/1999 | Cole |
| 6,143,253 A | 11/2000 | Radcliffe et al. |
| 6,180,354 B1 | 1/2001 | Singh et al. |
| 6,361,757 B1 | 3/2002 | Shikada et al. |
| 6,395,944 B1 | 5/2002 | Griffiths |
| 6,412,559 B1 | 7/2002 | Gunter et al. |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kindig et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 7,001,579 B2 | 2/2006 | Metzger et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 2001/0055559 A1 | 12/2001 | Sanfilippo et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |

(56) References Cited

U.S. PATENT DOCUMENTS

| | | |
|---|---|---|
| 2008/0209807 A1 | 9/2008 | Tsangaris et al. |
| 2009/0000194 A1* | 1/2009 | Fan .................. C01B 3/16 48/199 R |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0054049 A1 | 3/2011 | Lambert et al. |
| 2011/0094226 A1 | 4/2011 | McHugh et al. |
| 2011/0146152 A1 | 6/2011 | Vimalchand et al. |
| 2011/0176968 A1 | 7/2011 | Fan et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashded et al. |
| 2013/0149650 A1 | 6/2013 | Gauthier et al. |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0295361 A1 | 10/2014 | Fan et al. |
| 2015/0238915 A1 | 8/2015 | Fan et al. |

FOREIGN PATENT DOCUMENTS

| | | | |
|---|---|---|---|
| CN | 102612625 | | 7/2012 |
| EP | 1134187 | A2 | 9/2001 |
| EP | 1138096 | A1 | 10/2001 |
| EP | 1445018 | A1 | 8/2004 |
| EP | 1580162 | A2 | 9/2005 |
| EP | 1845579 | A2 | 10/2007 |
| EP | 1933087 | | 6/2008 |
| EP | 2450420 | | 5/2012 |
| EP | 2515038 | | 10/2012 |
| EP | 2601443 | | 6/2013 |
| FR | 2924035 | | 5/2009 |
| JP | H10249153 | A | 9/1998 |
| TW | 406055 | B | 9/2000 |
| TW | 426728 | B | 3/2001 |
| WO | WO 90/13773 | | 11/1990 |
| WO | 9965097 | A1 | 12/1999 |
| WO | 0022690 | A1 | 4/2000 |
| WO | WO 00/68339 | | 11/2000 |
| WO | 0142132 | A1 | 6/2001 |
| WO | WO 0142132 | A1 * | 6/2001 ............ C01B 3/12 |
| WO | WO 03/070629 | | 8/2003 |
| WO | 2007082089 | A2 | 7/2007 |
| WO | 2007122498 | A2 | 11/2007 |
| WO | WO 2007/134075 | | 11/2007 |
| WO | 2008019079 | A2 | 2/2008 |
| WO | 2008082312 | A1 | 7/2008 |
| WO | WO 2008/115076 | | 9/2008 |
| WO | WO 2009/007200 | | 1/2009 |
| WO | WO 2009/009388 | | 1/2009 |
| WO | 2009021258 | A1 | 2/2009 |
| WO | WO 2009/114309 | | 9/2009 |
| WO | 2010037011 | A2 | 4/2010 |
| WO | 2010063923 | A2 | 6/2010 |
| WO | WO 2010/126617 | | 11/2010 |
| WO | WO 2011/021161 | | 2/2011 |
| WO | WO 2011/031752 | | 3/2011 |
| WO | WO 2011/031755 | | 3/2011 |
| WO | WO 2012/064712 | | 5/2012 |
| WO | WO 2012/077978 | | 6/2012 |
| WO | WO 2012/155054 | | 11/2012 |
| WO | WO 2012/155059 | | 11/2012 |
| WO | WO 2013/040645 | | 3/2013 |
| WO | WO 2014/085243 | | 6/2014 |

OTHER PUBLICATIONS

Ockwig et al., "Membranes for Hydrogen Separation", Chem. Rev. 2007, U.S., pp. 4078-4110.

Li et al., "Clean coal conversion processes—progress and challenges", Energy & Environmental Science 2008, 1, pp. 248-267.

Hildebrandt et al., "Producing Transportation Fuels with Less Work", Science 323, Mar. 27, 2009, pp. 1680-1681.

Kaiser et al., "Precombustion and Postcombustion Decarbonization", IEEE Power Eng. Review 21, 2001, pp. 15-17.

International Search Report and Written Opinion, mailed Apr. 1, 2011 pertaining to PCT/US2010/048121 filed Sep. 8, 2010.

Herzog, "Carbon Sequestration via Mineral Carbonation: Overview and Assessment", MIT Laboratory for Energy and the Environment, http://sequestration.mit.edu/pdf/carbonates.pdf, Mar. 14, 2002.

Ohio Coal Development Office of the Ohio Air Quality Development Authority, "Ohio Coal Research Consortium (OCRC)—IV, Year 3 Proposals Solicitation", http://www.ohioairquality.org/ocdo/other_pdf/Consortium_IV_Year_3_RFP. pdf. Annual Project Report as of Dec. 2001.

Cho et al., "Comparison of iron-, nickel, copper- and manganese-based oxygen carriers for chemical-looping combustion", Fuel, vol. 83, pp. 1215-1225, 2004.

U.S. Department of Energy, NCCTI Energy Technologies Group, Office of Fossil Energy, "CO2 Capture and Storage in Geologic Formations", pp. 34, Revised Jan. 8, 2002.

Environmental Protection Agency, "Geological CO2 Sequestration Technology and Cost Analysis", Technical Support Document, pp. i-vi & pp. 1-61, Jun. 2008.

Geldart, "Types of Gas Fluidization", Powder Technology, vol. 7, pp. 285-292, 1973.

Haque, "Microwave energy for mineral treatment processes—a brief review", International Journal of Mineral Processing, vol. 57, pp. 1-24, 1999.

Hawley's Condensed Chemical Dictionary, entry for "ammonium bisulfate", John Wiley & Sons, Inc. 2002.

Hossain et al., "Chemical-looping combusion (CLC) for inherent CO2 separations—a review", Chemical Engineering Science, vol. 63, pp. 4433-4451; 2008.

Jin et al., "Development of a Novel Chemical-Looping Combustion: Synthesis of a Looping Material with a Double Metal Oxide of Co0-NiO", Energy & Fuels, vol. 12, pp. 1272-1277, 1998.

Huijgen et al., "Carbon dioxide sequestration by mineral carbonation", ECN-C—03-016, www.ecn.nl/docs/library/report/200e/c03016.pdf, Feb. 2003.

Jadhav et al., "Carbonation of Mg-Bearing Minerals: Kinetic and Mechanistic Studies", Ohio Coal Research Consortium/Ohio State University Project C3.12, www.ohiocoal.org/projects/year3/c3.12, Jul. 3, 2002.

Li et at., "Clean coal conversion processes—progress and challenges", The Royal Society of Chemistry, Energy & Environmental Science, vol. 1, pp. 248-267, Jul. 30, 2008.

Mattisson et al., "Applications of chemical-looping combustion with capture of CO2", Second Nordic Minisymposium on Carbon Dioxide Capture and Storate, Goeteborg, pp. 46-51, Oct. 26, 2001.

Mattisson et al., "Reactivity of Some Metal Oxides Supported on Alumina with Alternating Methane and Oxygen—Application for Chemical-Looping Combustion", energy & Fuels, vol. 17, pp. 643-651, 2003.

Mattisson et al., "The use of iron oxide as an oxygen carrier in chemical-looping combustion of methane with inherent separation of CO2", Fuel, vol. 80, pp. 1953-1962, 2001.

Mattisson et al., "Use of Ores and Industrial Products As Oxygen Carriers in Chemical-Looping Combustion", Energy & Fuels, vol. 23, pp. 2307-2315, 2009.

(56) References Cited

OTHER PUBLICATIONS

O'Connor et al., "Carbon Dioxide Sequestration by Direct Mineral Carbonation: Results from Recent Studies and Current Status", Abstract, USDOE Office of Fossil Energy, 2001.
Park et al., "CO2 Mineral Sequestration: Chemically Enhanced Aqueous Carbonation of Serpentine", The Canadian Journal of Chemical Engineering, vol. 81, pp. 885-890, Jun.-Aug. 2003.
Park et al., "CO2 Mineral Sequestration: physically activated dissolution of serpentine and pH swing process", Chemical Engineering Science, vol. 59, pp. 5241-5247, 2004.
Russo et al., "Impact of Process Design of on the Multiplicity Behavior of a Jacketed Exothermic CSTR", AIChE Journal, vol. 41, No. 1, pp. 135-147, Jan. 1995.
Shen et al, "Chemical-Looping Combustion of Biomass in a 10 kWth Reactor with Iron Oxide as an Oxygen Carrier", Energy & Fuels, vol. 23, pp. 2498-2505, 2009.
Steinfeld et al., "Design Aspects of Solar Thermochemical Engineering—A Case Study: Two-Step Water-Splitting Cycle Using the Fe3O4/FeO Redox System" Solar Energy, vol. 65, No. 1, pp. 43-53, 1999.
Steinfeld, "Solar hydrogen production via a two-step water-splitting thermochemical cycle based on Zn/ZnO redox reactions", International Journal of Hydrogen Energy, vol. 27, pp. 611-619, 2002.
Vernon et al., "Partial Oxidation of Methane to Synthesis Gas", Catalysis Letters, vol. 6, pp. 181-186, 1990.
International Search Report and Written Opinion for International Application PCT/US2010/048125 dated Dec. 17, 2010.
International Preliminary Report on Patentability for International Application PCT/US2010/048125 dated Mar. 22, 2012.
Office Action for Chinese Patent Application No. 201080048130.2 dated Nov. 13, 2013.
European Search Report for Application No. 07716591.8 dated Mar. 6, 2012.
International Search Report and Written Opinion for International Application No. PCT/US2007/000956 dated Dec. 4, 2007.
International Preliminary Report on Patentability for International Application No. PCT/US2007/000956 dated Jul. 24, 2008.
International Search Report and Written Opinion for International Application No. PCT/US2009/058579 dated Aug. 3, 2010.
International Preliminary Report on Patentability for International Application No. PCT/US2010/048121 dated Mar. 22, 2012.
International Search Report and Written Opinion for International Application No. PCT/US2011/059736 dated Mar. 27, 2012.
International Preliminary Report on Patentability for International Application No. PCT/US2011/059736 dated May 23, 2013.
International Search Report and Written Opinion for International Application No. PCT/US2012/37544 dated Aug. 10, 2012.
International Preliminary Report on Patentability for International Application No. PCT/US2012/037544 dated Nov. 12, 2013.
International Search Report and Written Opinion for International Application No. PCT/US2012/037557 dated Aug. 13, 2012.
International Preliminary Report on Patentability for International Application No. PCT/US2012/037557 dated Nov. 21, 2013.
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
Office Action for Canadian Application No. 2636325 dated Dec. 5, 2012.
Office Action for Chinese Patent Application No. 200780006757.X dated Apr. 11, 2011.
Office Action for Chinese Patent Application No. 200780006757.X dated Dec. 8, 2011.
Office Action for Chinese Patent Application No. 200780006757.X dated Jul. 4, 2012.
Final Rejection for Chinese Patent Application No. 200780006757.X dated Feb. 1, 2013.
Office Action for Chinese Patent Application No. 201110226206.2 dated Sep. 5, 2012.
Office Action for Chinese Patent Application No. 201110226206.2 dated May 14, 2013.
Office Action for Chinese Patent Application No. 201110226206.2 dated Sep. 18, 2013.
Office Action pertaining to U.S. Appl. No. 13/121,009 dated Sep. 6, 2012.
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action for Taiwanese Patent Application No. 098132745 dated Aug. 7, 2013.
Office Action for Taiwanese Patent Application No. 098132745 dated Oct. 17, 2012.
Office Action for Chinese Patent Application No. 200980141285.8 dated Feb. 26, 2013.
Office Action for Chinese Patent Application No. 200980141285.8 dated Oct. 29, 2013.
Office Action for Chinese Patent Application No. 201080048173.0 dated Nov. 18, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
Chinese Patent Office Action for Application No. 201080048130.2 dated Jul. 24, 2014 (6 pages, English translation only).
Chinese Patent Office Action for Application No. 201080048130.2 dated Mar. 13, 2015 (4 pages, English translation only).
Chinese Patent Office Action for Application No. 201080048173.0 dated Sep. 2, 2014 (3 pages, English translation only).
Chinese Patent Office Action for Application No. 201080048173.0 dated Jan. 16, 2015 (14 pages, English translation included).
Chinese Patent Office Action for Application No. 201080048173.0 dated Jul. 9, 2015 (12 pages, English translation included).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 14/091,654 dated Oct. 30, 2014 (14 pages).
United States Patent Office Action for U.S. Appl. No. 14/091,654 dated Jun. 12, 2015 (16 pages).
United States Patent Office Notice of Allowance for U.S. Appl. No. 14/504,295 dated Sep. 28, 2015 (10 pages).
United States Patent Office Notice of Allowance for U.S. Appl. No. 13/394,572 dated Dec. 14, 2015 (10 pages).
United States Patent Office Action for U.S. Appl. No. 12/160,803 dated Feb. 23, 2016 (27 pages).
United States Patent Office Action for U.S. Appl. No. 13/394,572 dated Oct. 13, 2015 (21 pages).

(56) References Cited

OTHER PUBLICATIONS

United States Patent Office Notice of Allowance for U.S. Appl. No. 13/394,572 dated Feb. 22, 2016 (8 pages).
United States Patent Office Action for U.S. Appl. No. 14/091,654 dated Jan. 4, 2016 (17 pages).
European Patent Office Action for Application No. 10760503.2 dated Sep. 25, 2015 (4 pages).
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe- Based Oxygen Carriers Using Syngas (CO + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Cao et al., "Investigation of Chemical Looping Combustion by Solid Fuels. 1. Process Analysis," Energy Fuels, 2006, 20(5), pp. 1836-1844.
De Diego et al., "Development of Cu-based oxygen carriers for chemical-looping combustion," Fuel, 2004, vol. 83, Issue 13, pp. 1749-1757.
Denton et al., "Simultaneous Production of High-Purity Hydrogen and Sequestration-Ready CO2 from Syngas," 2003.
Fan et al., "Chemical looping processes for CO2 capture and carbonaceous fuel conversion prospect and opportunity," Energy Environmental Science, 2012, p. 7254-7280.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Hua et al., "Three Dimensional Analysis of Electrical Capacitance Tomography Sensing Fields," 1999 IOP Publishing LTD, vol. 10, pp. 717-725.
Johansson et al., "Combustion of Syngas and Natural Gas in a 300 W Chemical-Looping Combustor," Chemical Engineering Research and Design Volume, 2006, vol. 84, Issue 9, pp. 819-827.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Mamman et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.
Pröll et al., "Syngas and a separate nitrogen/argon stream via chemical looping reforming—A 140 kW pilot plant study," Fuel, 2010, vol. 89, Issue 6, pp. 1249-1256.
Ruchenstein et al., "Carbon dioxide reforming of methane over nickel/alkaline earth metal oxide catalysts," Applied Catalysis A, 1995, vol. 133, p. 149-161.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping," AICHE Journal, 2006, vol. 52, Issue 9, pp. 3325-3328.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Usachev et al., "Conversion of Hydrocarbons to Synthesis Gas: Problems and Prospects," Petroleum Chemistry, 2011, vol. 51, p. 96-106.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Australian Patent Office Examination Report No. 1 for Application No. 2010292310 dated Mar. 3, 2016 (4 pages).

\* cited by examiner

REACTIONS:
$CH_4 + 4Fe_2O_3 \rightarrow CO_2 + 2H_2O + 8FeO$
COAL/BIOMASS $\rightarrow$ C + $CH_4$
$CO + FeO \rightarrow Fe + CO_2$
$C + CO_2 \rightarrow 2CO$
$C + H_2O \rightarrow CO + H_2$
$CO + FeO \rightarrow Fe + CO_2$
$H_2 + FeO \rightarrow Fe + H_2O$

SYNTHETIC FUELS AND CHEMICALS PRODUCTION WITH IN-SITU $CO_2$ CAPTURE

The present invention is generally directed to systems and methods for synthetic fuels and chemical products generation with in-situ $CO_2$ capture. A reduction-oxidation (redox) system using one or more chemical intermediates is generally utilized in conjunction with liquid fuel generation via indirect $CO_2$ hydrogenation, direct hydrogenation, or pyrolysis.

Fossil fuels including crude oil, natural gas, and coal provide more than 85% of today's energy supply. These fossil fuels are usually transformed to carriers such as electricity and liquid transportation fuels prior to utilization by end consumers. Electricity is mainly produced by relatively abundant energy sources such as coal, natural gas, and nuclear. In contrast, liquid transportation fuel is almost exclusively obtained from crude oil, whose supply is relatively insecure with volatile prices. With an increasing energy demand and concomitant concerns over carbon emissions from fossil fuel usage, affordable synthetic transportation fuels from more abundant resources such as coal, biomass, and oil shale are desirable. To address the environmental concerns, the next generation synthetic fuel production processes need to be able to capture pollutants generated in the process. These pollutants include $CO_2$, sulfur compounds, and mercury, among others.

Synthetic fuel is generated from gaseous fuels such as natural gas through reforming and the Fischer-Tropsch ("F-T") scheme. Solid fuels such as coal, biomass, and pet coke can be converted to synthetic fuel through indirect liquefaction (gasification-water gas shift-Fischer-Tropsch), direct liquefaction, or pyrolysis. These systems are, however, more capital intensive than oil refining processes. Moreover, their energy conversion efficiencies are relatively low.

Synthetic fuel can also be generated from biomass via biochemical routes. However, a large amount of process water is utilized. Moreover, the biochemical approaches have stringent requirements on the feedstock.

All the aforementioned processes involve $CO_2$ emissions. $CO_2$ capture from these processes associates with notable energy losses and hence decreases in process efficiency.

Embodiments of the present invention provide alternatives to produce synthetic fuel from naturally occurring carbonaceous fuel sources with high efficiency and effective $CO_2$ capture.

Embodiments of the present invention are generally directed to novel redox based systems for fuel and chemical production with in-situ $CO_2$ capture. A redox system using one or more chemical intermediates is generally utilized in conjunction with liquid fuel generation via indirect Fischer-Tropsch synthesis, direct hydrogenation, or pyrolysis. The redox system is used to generate a hydrogen rich stream and/or $CO_2$ and/or heat for liquid fuel and chemical production. A portion of the byproduct fuels and/or steam from liquid fuel and chemical synthesis is used as part of the feedstock for the redox system.

Additional features and advantages provided by embodiments of the present invention will be more fully understood in view of the following detailed description.

The following detailed description of the illustrative embodiments of the present invention can be best understood when read in conjunction with the following drawings, where like structure is indicated with like reference numerals and in which.

Figure 3:
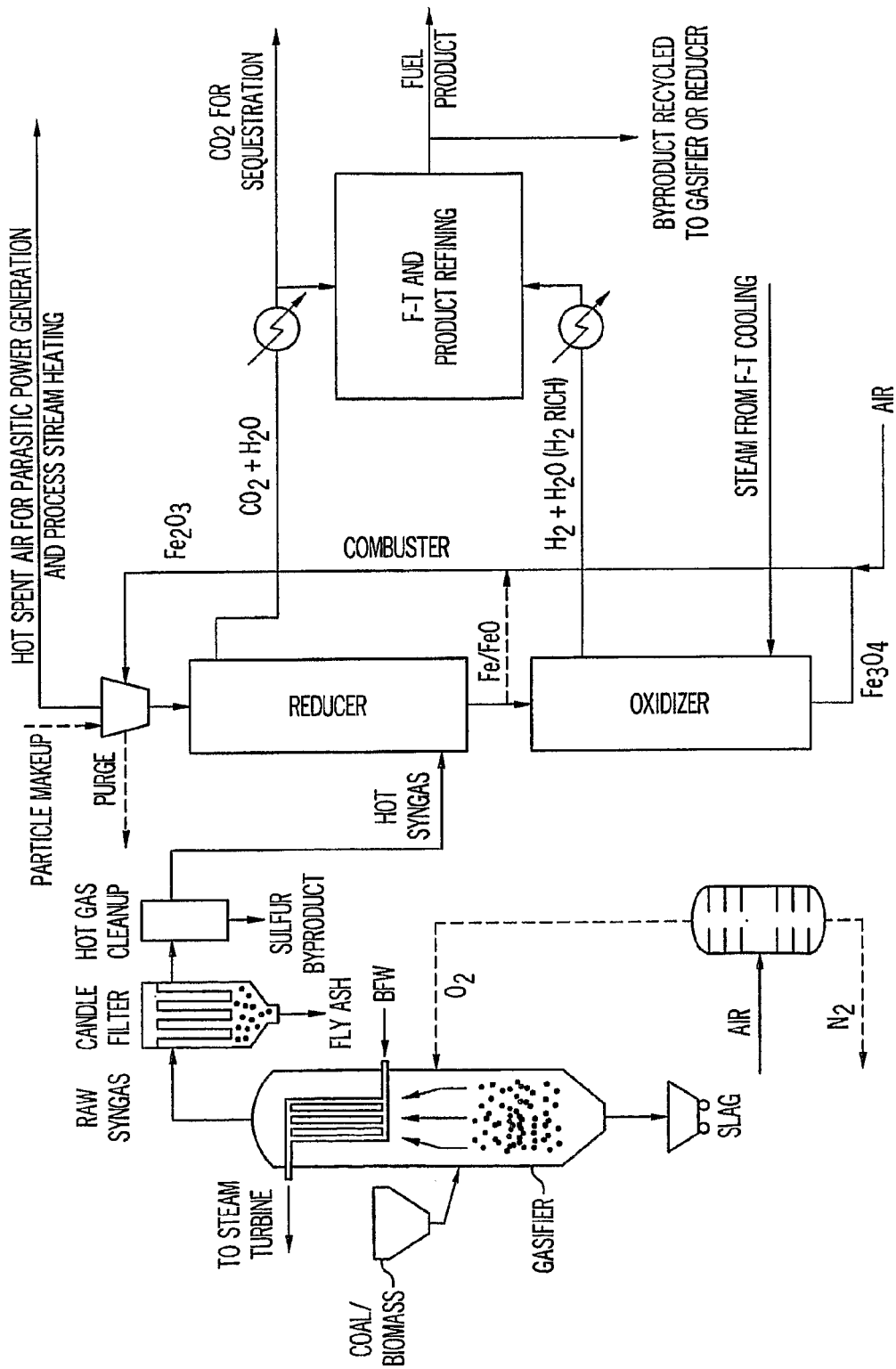

FIG. 3 illustrates another embodiment of the integration of an iron oxide based gaseous fuel indirect reforming/gasification system and Fischer-Tropsch synthesis. Coal and a coal gasification unit are used in this case to produce syngas fuel. Methane and hydrocarbons can also be directly used in this system. Alternatively, a reformer can be installed in place of the gasification unit (gasifier) to convert hydrocarbon fuels.

Figure 4:
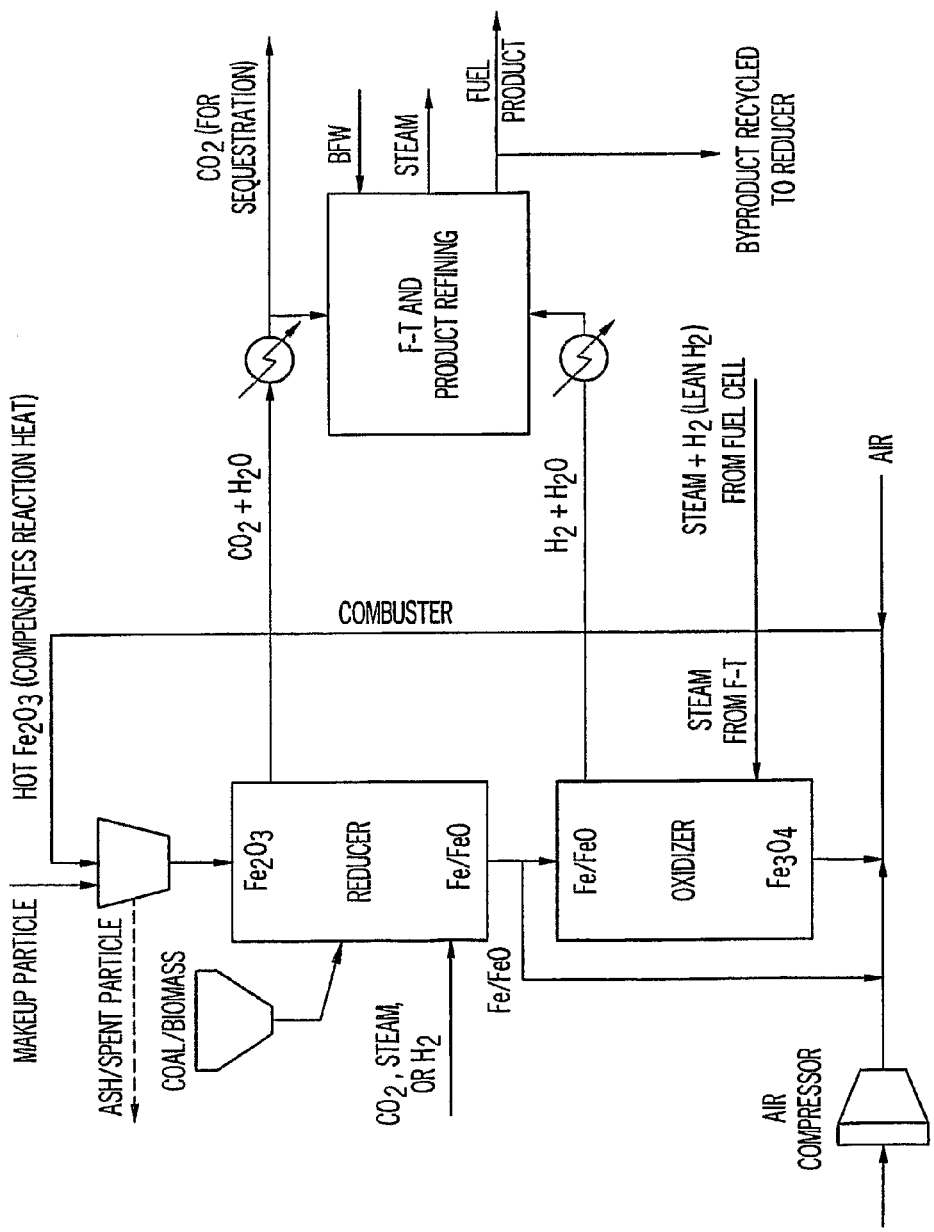

FIG. 4 illustrates another embodiment using the integration of an iron oxide based solid fuel indirect gasification system and Fischer-Tropsch synthesis. Besides biomass and coal, other solid fuels such as pet coke, tar sands, oil shale, and waste derived fuel can also be used in this system.

Figure 5:
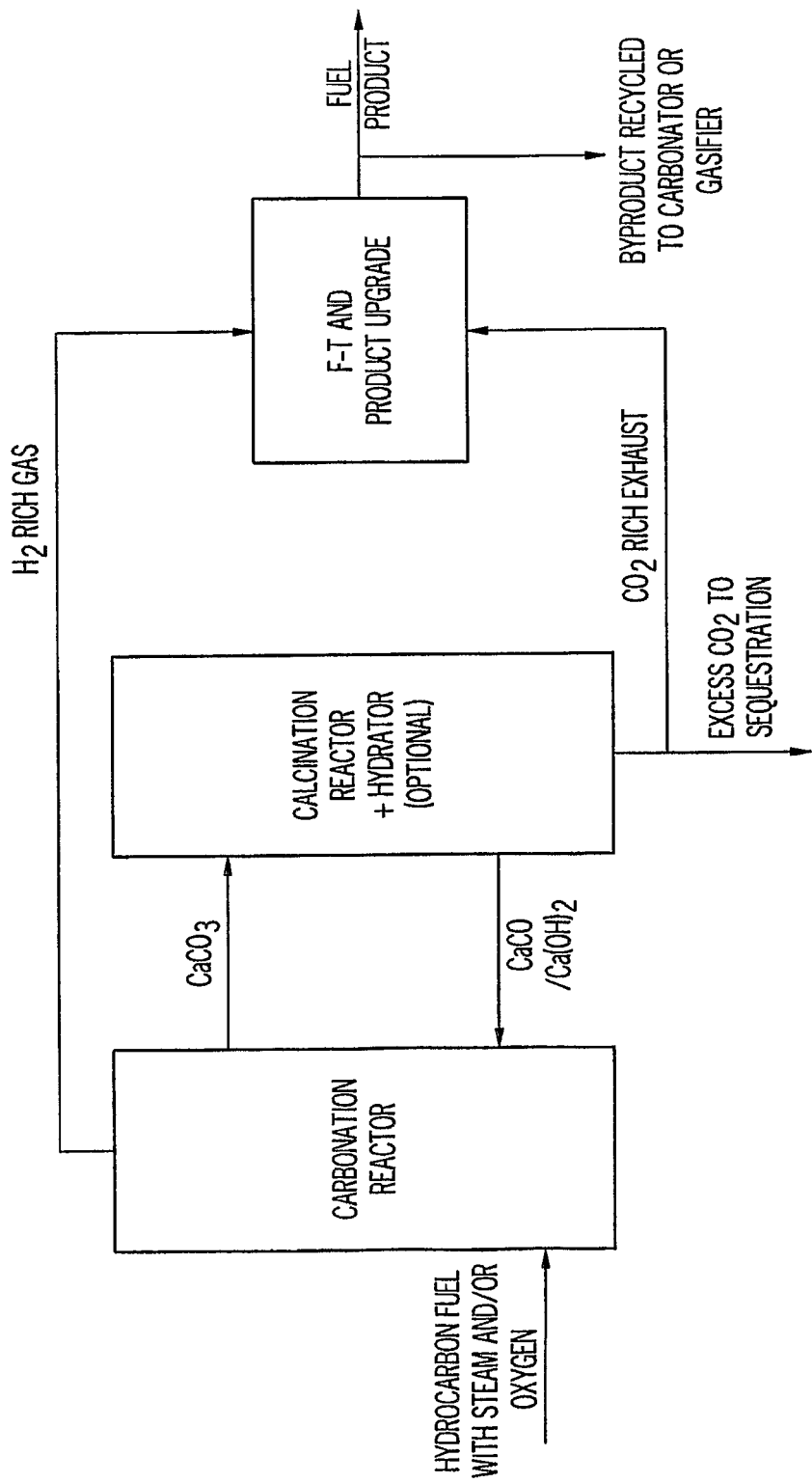

FIG. 5 illustrates another embodiment using the integration of a sorbent enhanced reforming/water gas shift system and Fischer-Tropsch synthesis. Gaseous fuels such as syngas and light hydrocarbons can be used in this system.

Figure 6:
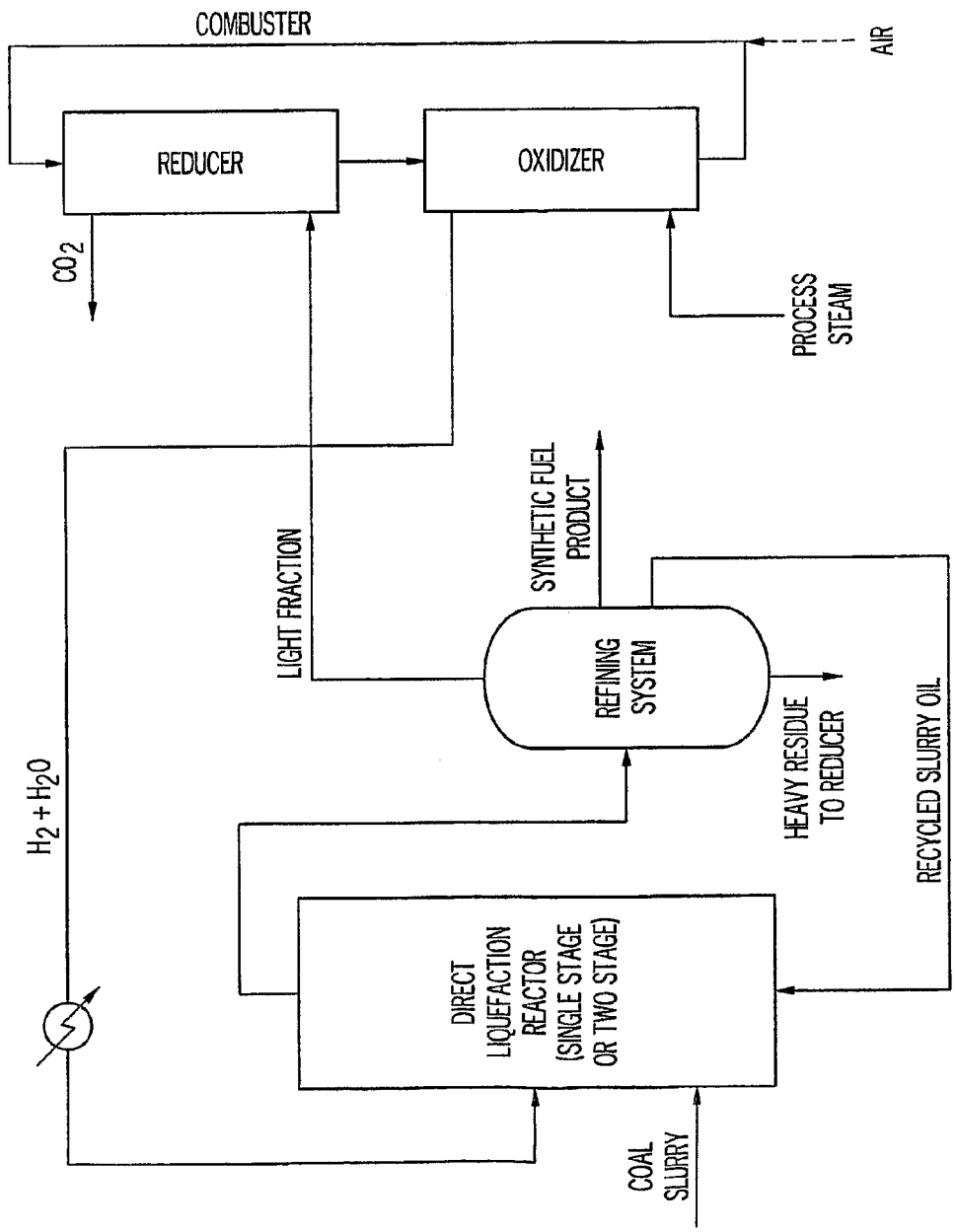

FIG. 6 is a schematic of another embodiment showing the integration between a direct coal to liquid sub-system and an indirect carbonaceous fuel reforming/gasification sub-system. A sorbent enhanced reforming/water gas shift system can also be used to replace the redox based indirect reforming/gasification sub-system.

Figure 7:
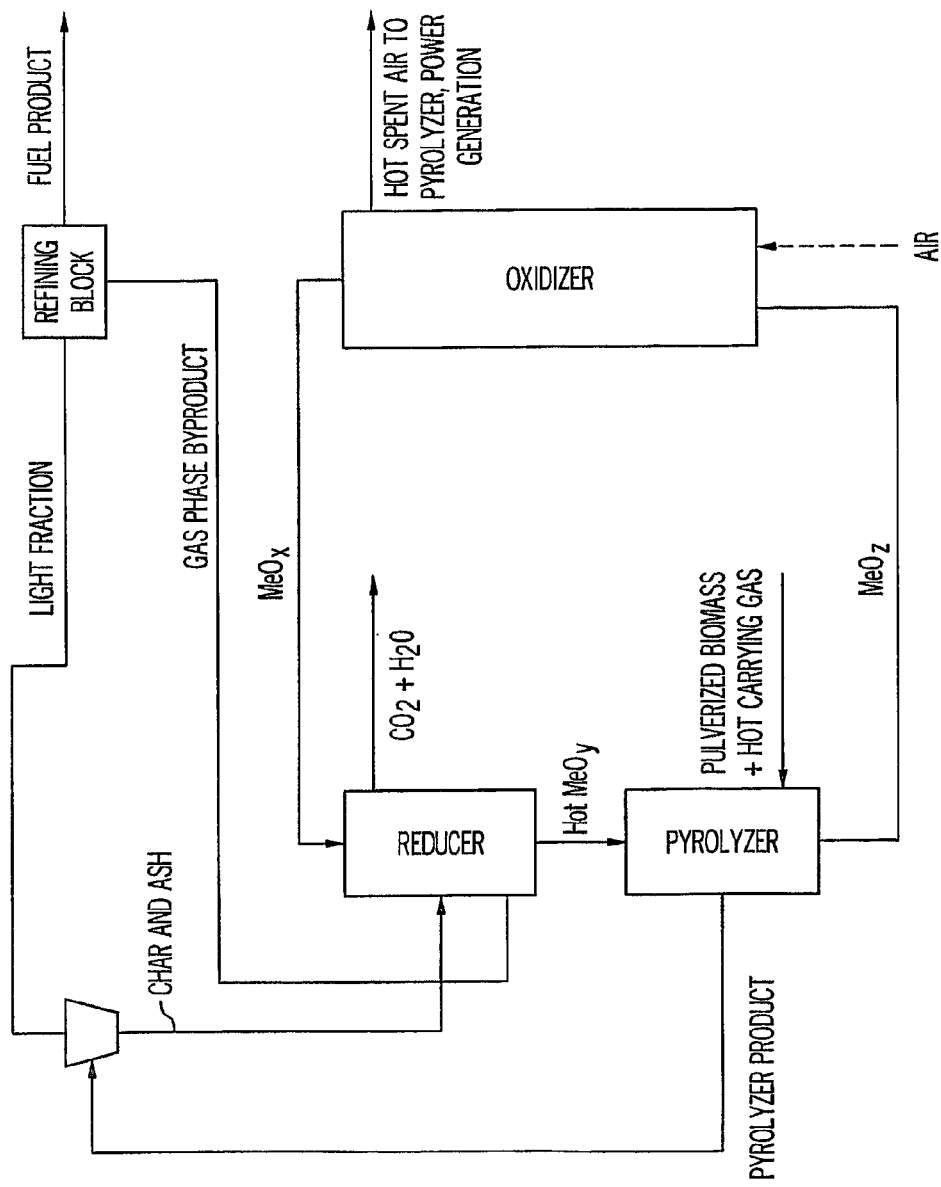

FIG. 7 shows another embodiment of the integration between a biomass pyrolyzer and an indirect carbonaceous fuel reforming/gasification sub-system for bio-oil synthesis.

Figure 8:
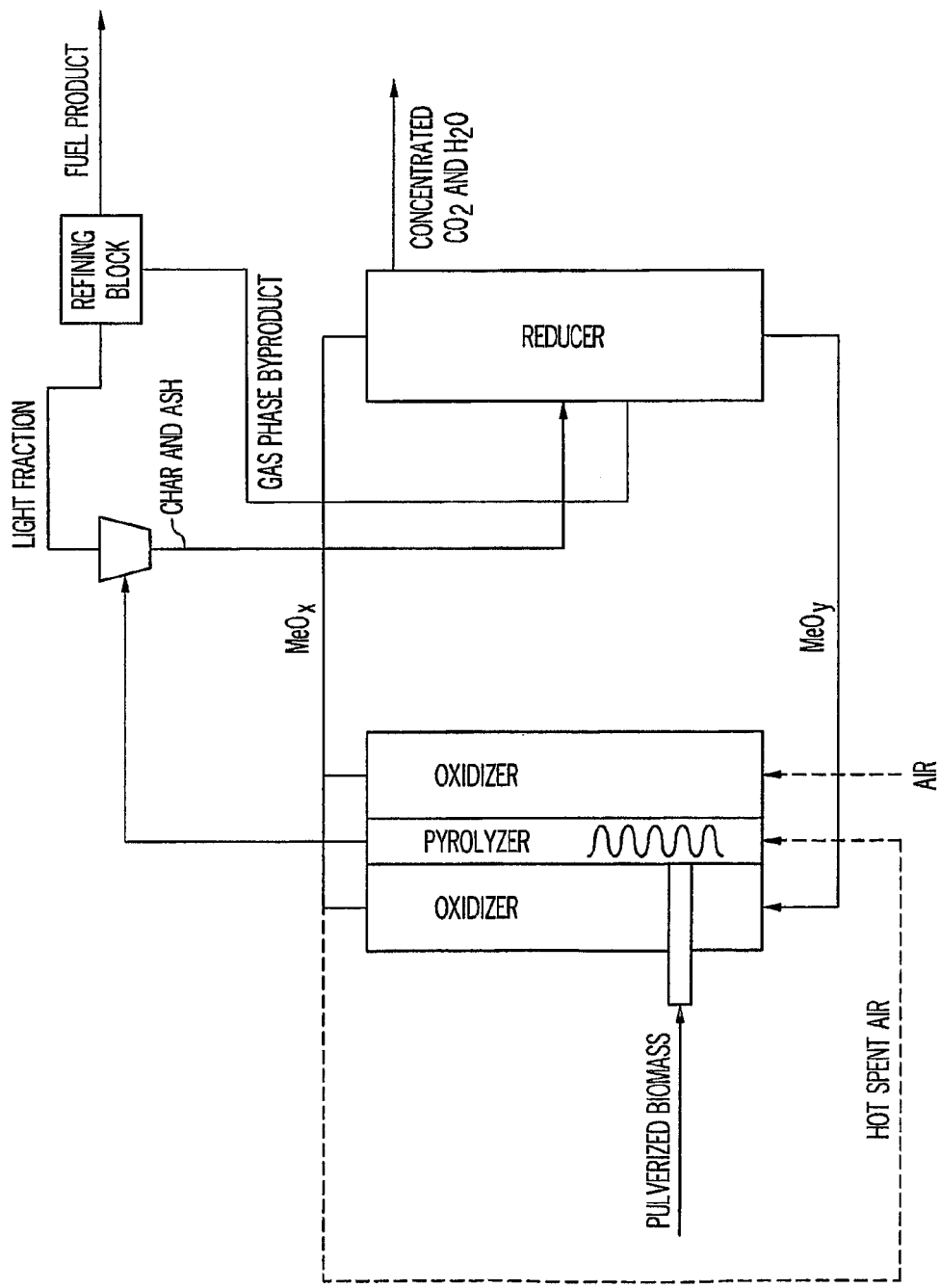

FIG. 8 is another embodiment illustrating the integration scheme between a biomass pyrolyzer and an indirect carbonaceous fuel reforming/gasification sub-system for bio-oil synthesis.

Figure 9A:
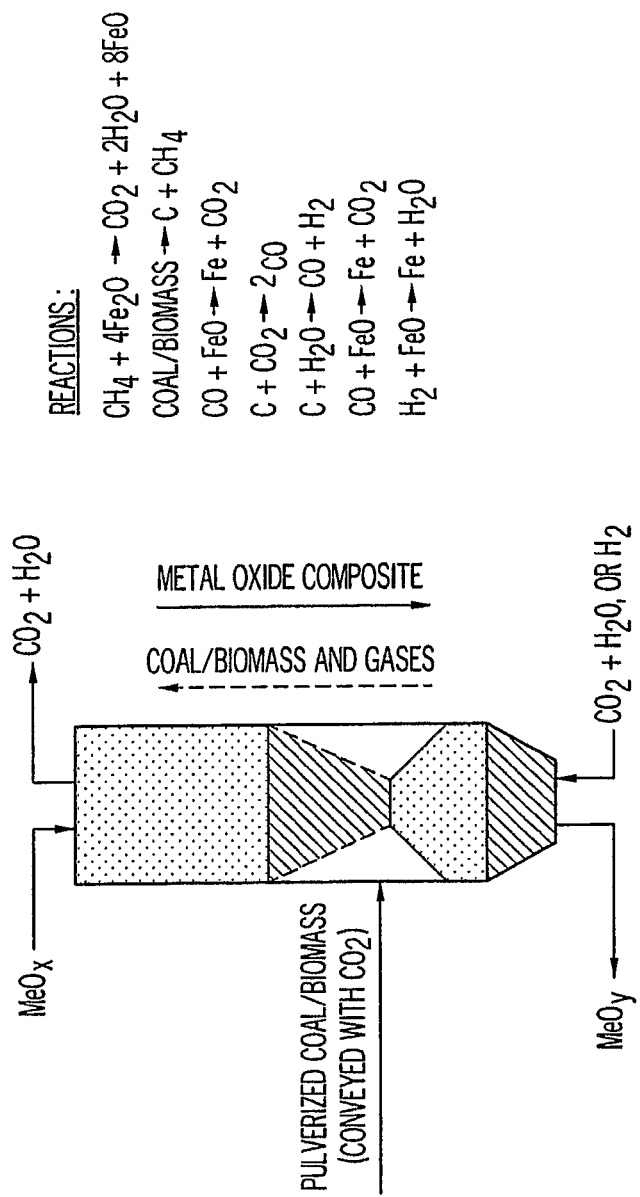

FIG. 9 illustrates additional reducer designs for pulverized coal/biomass conversion in a countercurrent moving bed with coal/biomass powder flowing upwards and metal oxide composites flowing downwards.

Figure 9C:
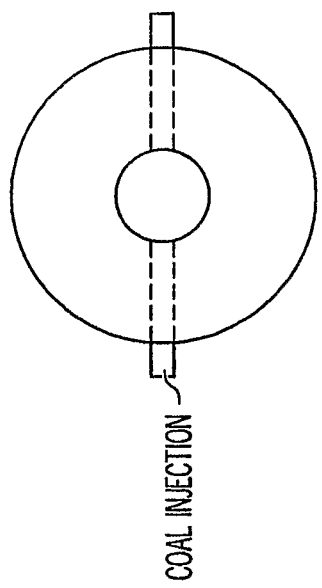
Figure 9B:
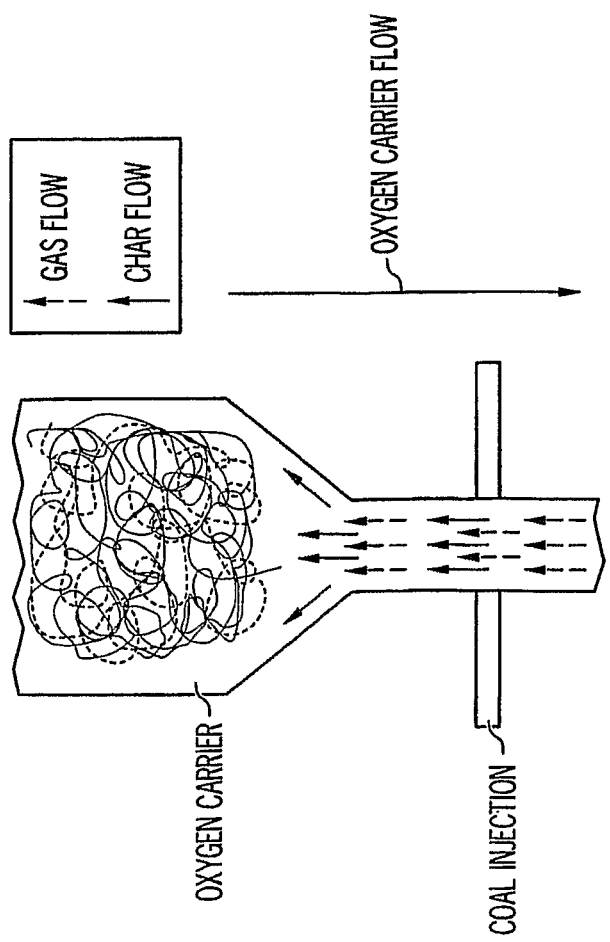

FIG. 9. (a) illustrates a moving bed reducer design for pulverized coal and biomass conversion; FIGS. 9(b) and 9(c) illustrate a potential design for coal injection and conversion.

Embodiment of the present invention are generally directed to systems and methods for converting carbonaceous fuels into synthetic fuels with minimal carbon emission and improved energy conversion efficiency. Such systems and methods generally include an indirect fuel reforming/gasification sub-system and a liquid fuel synthesis sub-system.

Based on the technique through which the synthetic fuel is produced, the various embodiments of the present invention can be generally grouped into three categories, i.e. indirect synthetic fuel generation integrated with an indirect fuel reforming/gasification sub-system, direct synthetic fuel generation integrated with an indirect reforming/gasification sub-system, and direct pyrolysis system integrated with an indirect fuel combustion sub-system. The following specification discusses the three categories respectively.

The indirect synthetic fuel generation system, which is strategically integrated with an indirect fuel reforming/gasification sub-system, is generally represented by FIGS. 1-5.

The indirect conversion of carbonaceous fuels such as coal and natural gas to synthetic liquid fuel through gasification/reforming followed by Fischer-Tropsch synthesis is well established. The processes, however, are inefficient due to the large irreversibility of the gasification/reforming step and the highly exothermic nature of the Fischer-Tropsch synthesis reactions and the inefficiency associated with the heat recovery and utilization. Further, significant energy losses will be incurred if the carbon generated in the process is captured. In addition, the indirect synthetic fuel generation systems are highly capital intensive.

The increasing concerns over energy security and $CO_2$ emissions have cast serious doubt on both the environmental and economical acceptability of indirect synthetic fuel generation systems. To reduce the cost and carbon footprint of the indirect liquid fuel synthesis systems, drastic improvement in process energy conversion efficiencies coupled with $CO_2$ capture are highly desirable. Embodiments of the present invention strategically integrate an indirect gasification/reforming sub-system with Fischer-Tropsch sub-system to achieve effects that: 1) reduce the irreversibility of the overall synthetic fuel product system; 2) improve the energy conversion efficiency; and 3) capture the $CO_2$ generated in the process.

According to one aspect, carbonaceous fuel such as coal, biomass, pet coke, syngas, natural gas, extra heavy oil, wax, and oil shale, are first converted into separate streams of $CO_2$ and $H_2$ through the assistance of one or more chemical intermediates. The $H_2$ and a portion of the $CO_2$ are then reacted in a Fischer-Tropsch synthesis reactor to produce synthetic fuels and chemicals. The remaining $CO_2$ is obtained in a concentrated form and can be readily sequestrated. The conversion of $CO_2$ and $H_2$, as opposed to CO and $H_2$, in the Fischer-Tropsch reactor reduces the exothermicity of the F-T reaction. Moreover, this scheme potentially reduces the endothermicity of the gasification/reforming step. As a result, the overall process irreversibility can be reduced. Moreover, the steam produced from the exothermic F-T reactor is readily available for hydrogen generation in the gasification/reforming sub-system. While the use of $CO_2$ and $H_2$ for F-T synthesis was studied in the 1990s, the method for $CO_2$ and $H_2$ generation from carbonaceous fuels and the unique integration schemes between the $CO_2/H_2$ generation sub-system described herein are novel.

Figure 1:
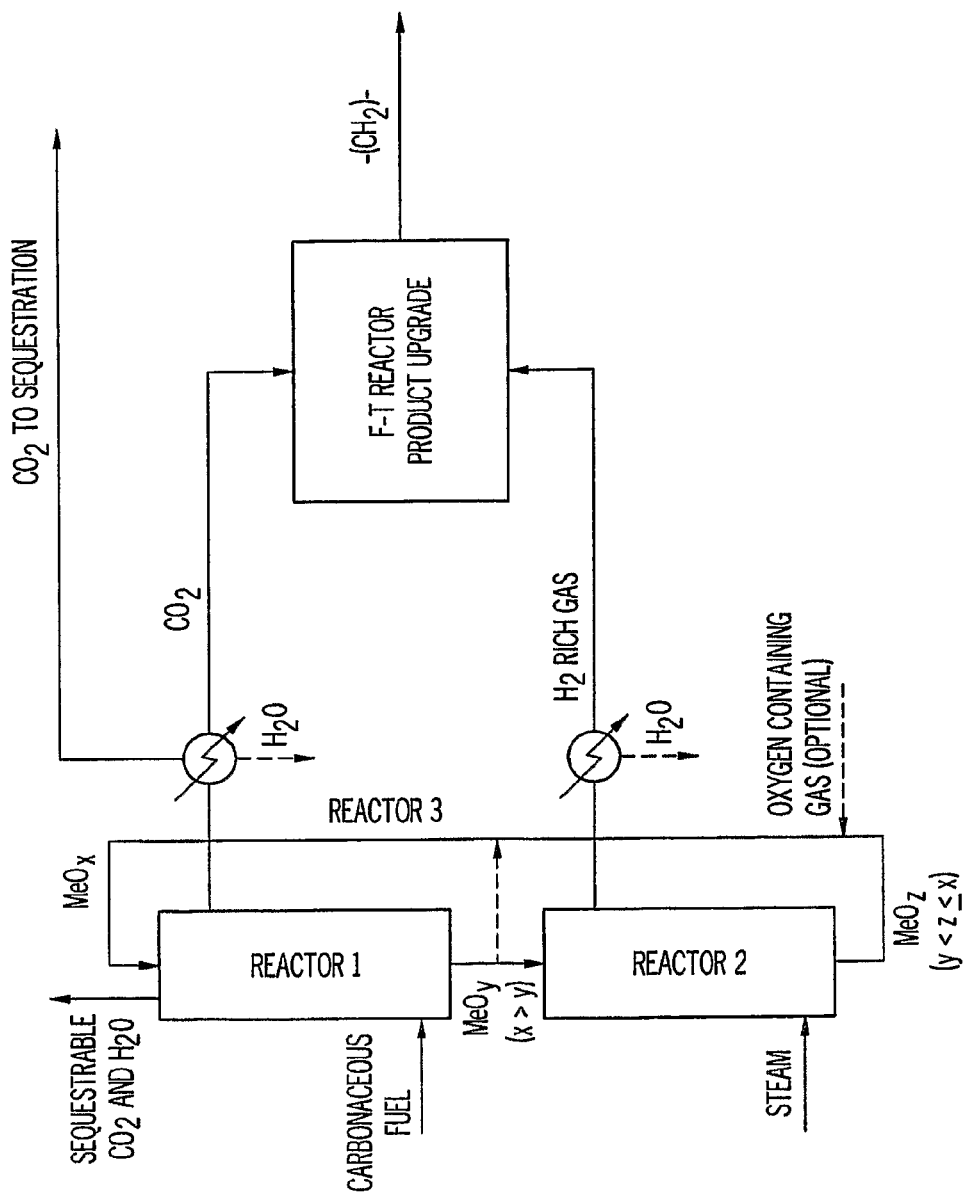
FIG. 1 illustrates a synthetic liquid fuel production embodiment that utilizes a combination of indirect reforming/gasification of carbonaceous feedstock and Fischer-Tropsch synthesis.

FIG. 1 is generally directed to an integration scheme of a redox based gasification/reforming sub-system and an F-T sub-system. With this configuration, a carbonaceous fuel is indirectly gasified/reformed into two separate streams of $CO_2$ and $H_2$. The two streams are then cooled and introduced into the F-T sub-system to produce liquid fuels. The reactions, which are not balanced, in this process include:

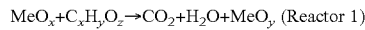

$MeO_x+C_xH_yO_z \rightarrow CO_2+H_2O+MeO_y$ (Reactor 1)

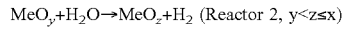

$MeO_y+H_2O \rightarrow MeO_z+H_2$ (Reactor 2, y<z≤x)

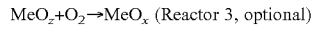

$MeO_z+O_2 \rightarrow MeO_x$ (Reactor 3, optional)

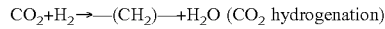

$CO_2+H_2 \rightarrow -(CH_2)-+H_2O$ ($CO_2$ hydrogenation)

Here $C_xH_yO_z$ refers to a carbonaceous fuel in general. Me is a metal or metal mixture that can be reduced by the carbonaceous fuel and subsequently oxidized by steam and air. Such metals include Fe, Co, In, Mn, Sn, Zn, Cu, W, and combinations thereof.

Reactor 1 is typically operated at 400-1200° C. and $1.01 \times 10^5$ Pa-$8.10 \times 10^6$ Pa (1-80 atm). Reactor 2 is operated at a temperature of 0-300° C. lower than Reactor 1. Reactor 3, which is optional depending on the type of metal and the system configuration, is operated at a temperature 0-400° C.

higher than Reactor 1. In preferred embodiments, Reactor 1 is operated at 600-900° C. The gasification/reforming sub-system is operated at $1.01 \times 10^5$ Pa-$3.04 \times 10^6$ Pa (1-30 atm).

In certain embodiments, Reactor 1 is endothermic. A portion of the reduced solids from Reactor 1 is directly sent to Reactor 3 for oxidation with oxygen containing gas. The heat released in Reactor 3 is used to compensate for the heat required in Reactor 1. The extra heat generated in Reactor 3 is used for power generation to support the parasitic power usage. A small portion of the hydrogen from Reactor 2 can be used for fuel product upgrading.

As showing in FIG. 1, carbonaceous fuel is fed near the bottom of Reactor 1. In one embodiment, the carbonaceous fuel comprises solid particles which are suspended buy the gases in a lower tapered section of Reactor 1 until they are at least to 50% converted before being elutriated towards the tope of Reactor 1. $CO_2$ rich gas and $H_2$ rich gas are produced from Reactor 1 and Reactor 2, respectively. These gaseous streams, which may contain steam, can be condensed prior to F-T synthesis. Alternatively, these gaseous streams can be directly used for F-T synthesis.

The F-T sub-system is operated at 200-500° C. and $1.01 \times 10^6$ Pa-$8.10 \times 10^7$ Pa (10-100 atm). In some embodiments, compression of the $CO_2$ rich gas and $H_2$ rich gas from the gasification/reforming sub-system are compressed.

Sulfur may present in the carbonaceous fuel, contaminating the $CO_2$ rich gas and $H_2$ rich gas streams. One or more sulfur removal units may be used to clean up the product gas streams. In the case where an iron based catalyst is used for F-T synthesis, a high temperature sorbent bed using solid sorbents such as CaO, ZnO, etc. can be used to reduce the sulfur contaminants to levels of 100 ppm or less. When a less sulfur tolerant catalyst such as cobalt based F-T catalyst is used for F-T synthesis, additional sulfur removal steps such as that using MDEA, SELEXOL (trade name), or Rectisol (trade name) may be used. In the case when low sulfur fuel such as low sulfur biomass and sulfur free natural gas or syngas is used, the sulfur removal units are not necessary.

Figure 2:
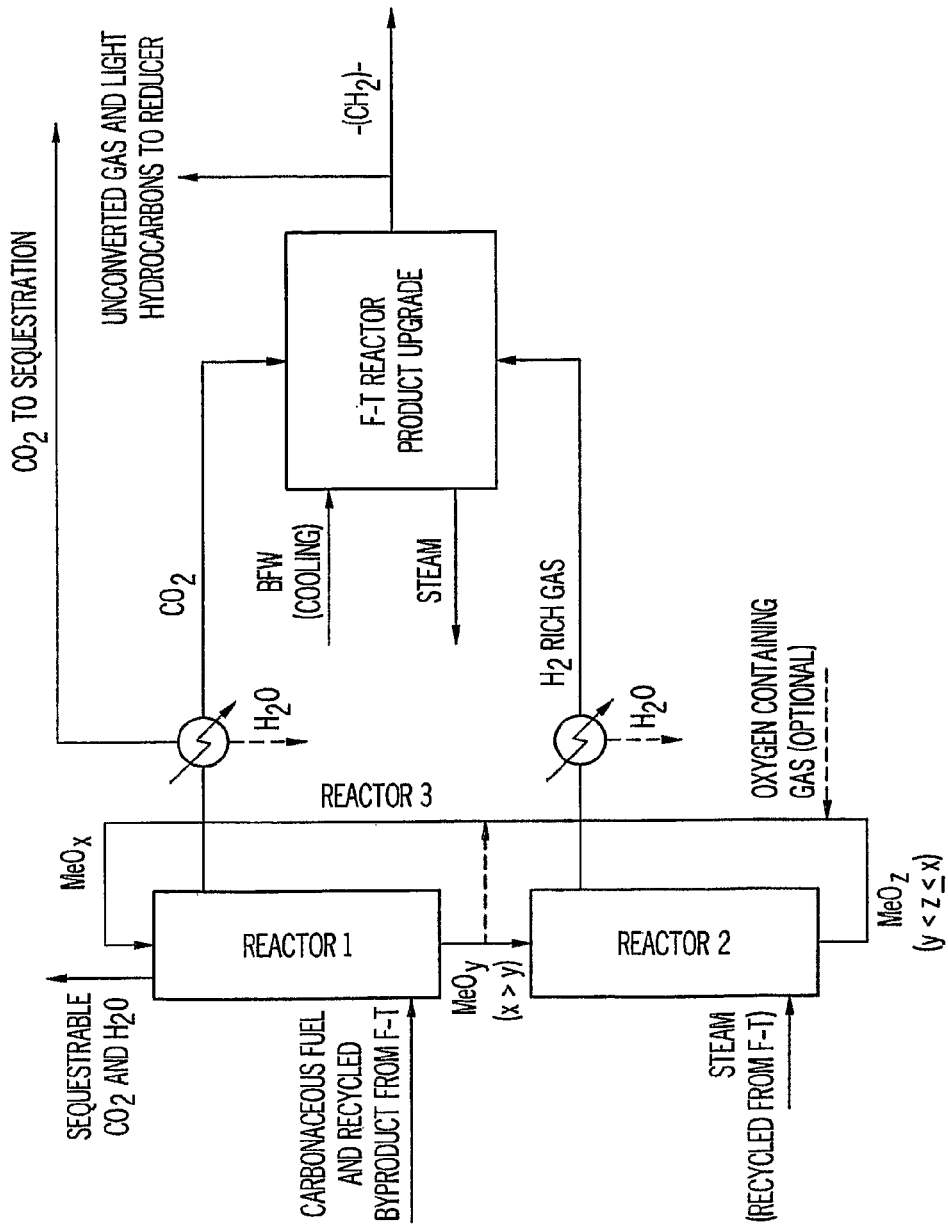
FIG. 2 is a schematic illustration of another embodiment illustrating the integration of the indirect reforming/gasification and Fischer-Tropsch synthesis.

FIG. 2 illustrates another process configuration which integrates the redox based gasification/reforming sub-system and the F-T sub-system. In this configuration, the unconverted fuels from the F-T sub-system are recycled back to Reactor 1 along with the carbonaceous fuel feedstock. By doing so, the byproduct from the F-T sub-system is converted to $H_2$ and $CO_2$, increasing the liquid fuel yield and selectivity of the process. In addition, the steam generated from the F-T sub-system is redirected to Reactor 2 of the gasification/reforming sub-system, reducing the need for steam generation in the process. The strategic utilization of the products and byproducts of both F-T and gasification/reforming sub-systems and their integration-recirculation schemes reduce the exergy loss of the overall process while increasing the yield of desired product, either chemical or synthetic liquid fuel. Any $CO_2$ generated in the process is readily sequestrable. As a result, the process is significantly less carbon intensive and more efficient than conventional coal to liquids schemes.

FIG. 3 further illustrates a more detailed process configuration, integrating an iron oxide based gasification/reforming sub-system and an F-T sub-system. In this embodiment, the gasification/reforming sub-system comprises a gasification/reforming unit and an iron based redox unit. Solid fuel is first converted into a gaseous fuel mixture.

The gaseous fuel is then injected to the reducer of the iron oxide redox system for hydrogen and $CO_2$ generation. A hot gas cleanup system may be required where the gaseous fuel is contaminated with a high level of sulfur. The three reactor iron oxide based redox system is used to convert the fuel in a manner similar to that disclosed in Thomas U.S. Pat. No. 7,767,191; Fan PCT Application No. WO 2007082089; and Fan PCT Application No. WO 2010037011. The first reactor, the reducer, is configured to oxidize the carbonaceous fuel into $CO_2$ and steam while reducing a metal oxide based oxygen carrier, such that the average valence of the metal is less than 1. The heat required or generated in the reducer is provided or removed by the oxygen carrier particle. The second reactor, the oxidizer, is configured to (partially) oxidize a portion of the reduced oxygen carrier with steam. The third reactor, the combustor, combusts the partially oxidized oxygen carrier from the oxidizer and the remaining portion of the reduced oxygen carrier from the reducer with air. The reactions in the iron oxide redox system include, without balancing the equations:

$$Fe_2O_3 + Fuel \rightarrow Fe/FeO + CO_2 + H_2O \text{ (avg. valence of Fe is <1) (Reducer)}$$

$$Fe/FeO + H_2O \rightarrow Fe_3O_4 + H_2 \text{ (Oxidizer)}$$

$$Fe_3O_4 + O_2 \text{ (Air)} \rightarrow Fe_2O_3 \text{ (Combustor)}$$

In one embodiment, all of the hydrogen from the oxidizer and a portion of the $CO_2$ from the reducer are introduced to the Fischer-Tropsch reactor to generate a mixture of hydrocarbons. The hydrocarbon mixture is then separated and refined. The fraction of the fuel mixture of lower economic value, e.g. unconverted syngas, light hydrocarbons, and naphtha, is sent to either the reducer or the gasifier/reformer to enhance carbon utilization. In essence, most of the carbon in the fuel is either fixed in the final synthetic fuel product or in the concentrated $CO_2$ stream which is ready for sequestration after moderate compression. Hence, the net life cycle $CO_2$ emissions of the system are comparable to petroleum based gasoline and diesel when coal is used as the fuel (with $CO_2$ capture and sequestration). In the case when biomass and natural gas are used as the fuel, the net life cycle $CO_2$ emission is much lower or even negative. In a carbon constrained scenario, a combination of feedstock such as coal/biomass, coal/natural gas can be used to reduce the $CO_2$ emissions while taking advantage of abundantly available coal.

The F-T reactor generates a large amount of steam for F-T cooling purposes, and a portion of the steam is used in the oxidizer for hydrogen generation. The rest of the steam, after supplemental firing or superheating with a small portion of byproduct fuel and heat exchanging with high temperature exhaust gas streams in the process, is used for power generation to meet the parasitic energy needs.

The oxygen carrier comprises a plurality of ceramic composite particles having at least one metal oxide disposed on a support. Ceramic composite particles are described in Thomas U.S. Pat. No. 7,767,191; Fan, published PCT Application No. WO 2007082089; and Fan, PCT Application No. WO 2010037011. In addition to the particles and particle formula and synthesis methods described in Thomas, applicants, in a further embodiment, have developed novel methods and supporting materials to improve the performance and strength of the ceramic composite particles used in the present system.

The novel methods include the step of mixing a metal oxide with at least one ceramic support material in slurry form followed by drying, granulation, and pelletization. Ceramic support materials in addition to those described in the prior publications include magnesium oxide, bentonite, olivine, kaoline, and sepiolite. Olivine is also used as a promoter for hydrocarbon conversion.

FIG. 4 illustrates an embodiment in which an iron based three reactor redox system directly converts solid fuels into $CO_2$ and $H_2$ followed by Fischer-Tropsch synthesis. In this embodiment, an iron oxide based oxygen carrier is reduced by a solid fuel. This is followed by steam regeneration and air combustion in a similar manner as the embodiment shown in FIG. 3.

Referring now to the reduction reaction in the first reactor of FIG. 4, i.e. the reducer, the reducer utilizes various solid carbonaceous fuels such as biomass, coal, tars, oil shales, oil sands, tar sand, wax, and coke to reduce the iron oxide containing ceramic composite to produce a mixture of reduced metal and/or metal oxide. In addition to the solid carbonaceous fuel, the byproducts and unconverted fuel from the liquid fuel synthesis sub-system are also converted in the reducer. The possible reduction reactions include:

$$FeO_x + Fuel \rightarrow FeO_y + CO_2 + H_2O$$

$$Fuel + CO_2 \rightarrow CO + H_2$$

$$Fuel + H_2O \rightarrow CO + H_2$$

$$FeO_x + CO/H_2 \rightarrow FeO_y + CO_2/H_2O$$

The preferred overall reaction is:

$$Fe_2O_3 + Fuel \rightarrow Fe/FeO + CO_2 + H_2O$$

Specifically, metallic iron (Fe) is formed in the reducer. Simultaneously, an exhaust stream that contains at least 80% $CO_2$ (dry basis) is produced from the reducer. In preferred embodiments, the $CO_2$ concentration exceeds 95% and is directly sequestrable.

The preferred designs of the reducer include a moving bed reactor with one or more stages, a multistage fluidized bed reactor, a step reactor, a rotary kiln, or any suitable reactors or vessels known to one of ordinary skill in the art that provide a countercurrent gas-solid contacting pattern. The counter-current flow pattern between solid and gas is used to enhance the gas and solid conversion. The counter-current flow pattern minimizes the back-mixing of both solid and gas. Moreover, this flow pattern keeps the solid outlet of the reactor at a more reductive environment while the gas outlet of the reactor in maintained in a more oxidative environment. As a result, the gas and solid conversion are both enhanced.

Referring back to the oxidation reaction in the second reactor in FIG. 4, i.e. the oxidizer, the oxidizer converts a portion of the iron containing oxygen carrier particles from the reducer to higher oxidation state using steam generated from Fischer-Tropsch cooling. The possible reactions include:

$$Fe + H_2O \rightarrow FeO + CO/H_2$$

$$3FeO + H_2O \rightarrow Fe_3O_4 + CO/H_2$$

The preferred designs of the oxidizer also include a moving bed reactor and other reactor designs that provided a countercurrent gas-solid contacting pattern. A countercurrent flow pattern is preferred so that high steam to hydrogen and $CO_2$ to CO conversion are achieved.

Referring back to the oxidation reaction in the third reactor in FIG. 4, i.e. the combustor, air or other oxygen containing gas is used to combust the remaining portion of the reducer solids product and all the oxidizer solids product. The possible reactions in the combustor include:

$$Fe/FeO/Fe_3O_4 + O_2 \rightarrow Fe_2O_3$$

Alternatively, all the reducer oxygen carrier product will be introduced to the oxidizer to react with a sub-stoichiometric amount of steam. Substantially all of the partially regenerated oxygen carrier from the oxidizer will then be introduced to the combustor. By doing this, no by-pass solids stream is needed.

The preferred reactor designs for the combustor include a fast fluidized bed reactor, an entrained bed reactor, a transport bed reactor, or a mechanical conveying system. The functions of the combustor include: oxidation of the oxygen carrier to a higher oxidation state; and re-circulation of the oxygen carrier to the inlet of the reducer for another redox cycle.

The combustor is highly exothermic. The heat generated in the combustor can be used to compensate for the heat required in the reducer. This heat can also be used to preheat the feed streams and to generate power for parasitic energy consumptions. The high pressure gaseous streams discharged from the system can be used to drive expanders for gas compression.

Table 1 illustrates the mass flow of the major streams in a process when Illinois #6 coal and switchgrass are used as the feedstock and synthetic diesel is the product. Table 2 illustrates the energy balance of the system.

TABLE 1

Mass Balance of the Integrated reforming/gasification - Fischer-Tropsch System for Liquid fuel Synthesis from coal

| Coal (feed, kg/s) | $CO_2$ from Reducer (kmol/s) | $H_2$ Rich Stream from Oxidizer (kmol/s) | Synthetic Diesel from Fuel Production Sub-System (bbl/day) |
|---|---|---|---|
| 36.9 | 2.2 | 4.5 (pure $H_2$ is 2.9) | 8700 |

TABLE 2

Energy Balance of the Integrated reforming/gasification - Fischer-Tropsch System for Liquid fuel Synthesis from coal

| Coal ($MW_{th}$) | Parasitic Power (MWe) | Power Generation (MWe) | Fuel Production ($MW_{th}$) | Process Efficiency (%) |
|---|---|---|---|---|
| 1000 | −80 | 82 | 620 | 62.2% |

Table 3 illustrates the mass and energy flow of the major streams in a process when switchgrass is used as the feedstock and synthetic diesel is the product.

TABLE 3

Mass and Energy Balance of the Integrated reforming/gasification - Fischer-Tropsch System for Liquid fuel Synthesis from switchgrass

| Switchgrass (Dry feed, kg/s) | Biomass Thermal Input ($MW_{th}$) | Synthetic Diesel from Fuel Production Sub-System (bbl/day) | Process Efficiency (%) |
|---|---|---|---|
| 5.3 | 100 | 818 | 55.5 |

Although the cases exemplified by Tables 1-3 are specific to the type of feedstock, product, reforming/gasification sub-system, and liquid fuel production system, the choices for the aforementioned parameters have a large degree of freedom. For instance, multiple types of solids fuels can be used as the feed and various synthetic fuel products can be produced.

FIG. 5 illustrates schematically in an embodiment which the reforming/gasification sub-system is comprised of sorbent enhanced reforming/gasification units. In this embodiment, a calcium based sorbent enhanced reforming process is used as the reforming/water splitting block. The fuel, which can be carbonaceous feed and/or byproduct from the liquid fuel synthesis sub-system, is reformed/shifted to $H_2$ with the presence of $CaO/Ca(OH)_2$ sorbent and steam generated from the F-T reactor:

$$CaO + Fuel + H_2O \rightarrow CaCO_3 + H_2$$

The spent sorbent is then regenerated at high temperatures using the waste heat from the system in the calciner:

$$CaCO_3 \rightarrow CaO + CO_2$$

A portion of the byproduct from the liquid fuel synthesis sub-system is combusted to provide the heat for calcination reaction. A hydration step is optionally added to reactivate the sorbent. The concentrated $CO_2$ from the calciner is then compressed and sequestered.

The hydrogen and a portion of $CO_2$ produced from the sorbent enhanced reforming scheme are then used to generate synthetic fuel. Compression of the $CO_2$ stream is required prior to fuel synthesis.

FIG. 6 illustrates an embodiment showing the integration between a direct liquefaction sub-system and the reforming/gasification sub-system. The reforming/gasification sub-system is identical to those exemplified in FIGS. 1-5, i.e. both metal oxide redox based and sorbent enhanced reforming/gasification sub-systems can be used. The liquid fuel synthesis sub-system comprises a single or two stage direct liquefaction reactor and a refining system. Coal slurry is directly converted to hydrocarbons with the presence of catalyst as well as hydrogen from the reforming/gasification sub-system. The pressure of the direct liquefaction reactor is $5.05 \times 10^6$ Pa-$1.01 \times 10^7$ Pa (50-100 atm) and the temperature is 400-650° C. The light fraction of the fuel and the byproduct such as heavy residue and char from the refining system are used as the fuel for the reforming/gasification sub-system. Moreover, steam generated in the coal liquefaction unit is also used for hydrogen production in the reforming/gasification sub-system. To generalize, the integrated system uses the byproduct from the liquid fuel synthesis sub-system to generate hydrogen for direct coal liquefaction. Moreover, nearly all the carbon, expect for that in the fuel product, is converted to a $CO_2$ rich exhaust gas stream from the reforming/gasification sub-system. The $CO_2$ rich stream is ready to be sequestered.

FIG. 7 illustrates an embodiment in which there is integration between a fast pyrolysis process and a redox based fuel combustion process. Biomass can be converted into bio-oil via a fast pyrolysis process. Fast pyrolysis, however, requires effective control of biomass temperature and notable heat input. In this embodiment, a metal oxide based two step redox process is used to provide heat for the pyrolyzer while capturing the carbon byproduct generated in the process.

The metal oxide is used as the carrier for both oxygen and heat. In the first unit, the reducer, high temperature metal oxide (600-1400° C.) is reduced by the residue char and light fractions from the pyrolyzer and refining block:

$$MeO_x + \text{unwanted fuel from pyrolyzer and refining block} \rightarrow MeO_y + CO_2$$

This step is mostly endothermic, the hot $MeO_y$ exiting the reducer is at a temperature ranging between 400-750° C.

The MeO$_y$ from the reducer enters into the prolyzer where it provides heat to the biomass feedstock for fast pyrolysis. The MeO$_y$ may become further reduced in the pyrolyzer to MeO$_z$. The temperature of the MeO$_z$ exiting the pyrolyzer ranges between 300-650° C. The reducer and pyrolyzer can be either a moving bed or a fluidized bed. A fluidized bed is preferred for the pyrolyzer.

The MeO$_z$ from the pyrolyzer is then introduced to the oxidizer, which is similar to the combustor unit described with respect to FIGS. 1-4. In the oxidizer, MeO$_z$ is combusted with oxygen containing gas such as air to regenerate to MeO$_x$:

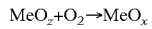
$$MeO_z + O_2 \rightarrow MeO_x$$

The outlet temperature of the oxidizer ranges from 600-1400° C. The preferred reactor designs for the oxidizer include a fast fluidized bed reactor, an entrained bed reactor, a transport bed reactor, or a mechanical conveying system. The preferred metal for the redox operation include but are not limited to Co, Fe, Cu, Ni, Mn, and W. The support material and the metal are selected such that the metal oxide composite is not very catalytically active for tar cracking.

FIG. 8 illustrates another embodiment for the integration of a biomass fast pyrolysis and redox process. In this embodiment, metal oxide composite does not directly contact the biomass feed, i.e. heat is indirectly provided to the fast pyrolyzer. In this embodiment, the fuel for the reducer is again the byproducts and char from fast pyrolysis of biomass. The reducer reduces the hot metal oxide from the oxidizer:

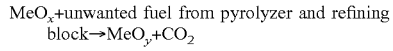
$$MeO_x + \text{unwanted fuel from pyrolyzer and refining block} \rightarrow MeO_y + CO_2$$

This step is often endothermic, the hot MeO$_y$ exiting the reducer at a temperature ranging between 400-750° C.

The reduced MeO$_y$ then enters the oxidizer which is preferably an entrained bed, transport bed, or a fast fluidized bed reactor. The oxidizer is designed similar to a shell and tube heat exchanger with metal oxide composite and air flowing in the shell side. Air oxidizes MeO$_y$ back to MeO$_x$.

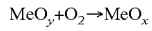
$$MeO_y + O_2 \rightarrow MeO_x$$

Significant heat is generated in this step. Meanwhile, high temperature exhaust air is also generated. The reducer can be either a moving bed or a fluidized bed.

The N$_2$ rich exhaust air, with a small amount of residual oxygen, can be directly used for biomass feeding and conveying in the fast pyrolyzer to provide the heat. In certain embodiments, an additional combustion step with excess amounts of byproduct fuel from the fast pyrolysis stage can be used to remove the residual oxygen prior to using the high temperature N$_2$ rich gas for biomass feeding and conveying.

Pulverized biomass is introduced into the pyrolyzer which is installed inside the oxidizer. The pulverized biomass, carried by the high temperature gas, is injected in a tangential direction into the pyrolyzer and is conveyed upwards by the high temperature gas in a swirling manner. The centrifugal force causes the biomass to be close to the pyrolyzer/oxidizer wall through which heat can be transferred to the biomass for pyrolysis. The pyrolyzer is a fast fluidized bed, entrained bed, or a dilute transport bed.

Alternatively, the reducer can be integrated with the pyrolyzer to provide the heat to the pyrolyzer from its outer wall. In both cases, the pyrolyzer is operated at between 300-650° C., the reducer is operated at between 400-1300° C., and the oxidizer is operated at between 450-1350° C.

The performance of the reducer in the redox based reforming/gasification sub-system is important to the success of the integrated embodiments as shown in FIGS. 1, 2, 3, 4, 6, 7, and 8. In addition to the designs disclosed in Fan, PCT Application No. WO 2007082089; and Fan, PCT Application No. WO 2010037011. improvements have made in the reducer design for conversion of solid fuels.

FIG. 9 illustrates an improved design of the reducer. In this design, metal oxide composite particles, which are large (0.5-10 mm) and more dense (>1.5 g/mL), are fed from the top of the reducer. The pulverized biomass or coal or other solid fuels, which are small (<0.5 mm) and less dense (<1.5 g/mL) are fed to the bottom section of the reducer. The pulverized coal or biomass is entrained by the conveying gas and flows upwards between the gaps of the composite particles while being converted. The composite particles move downwards and are reduced before exiting the reducer.

The invention claimed is:

1. A method for producing synthetic liquid fuel from a carbonaceous fuel comprising:
   indirectly gasifying the carbonaceous fuel using steam and optionally, an oxygen containing gas, and forming separate streams of carbon dioxide and hydrogen rich gases, wherein metal oxide particles containing Fe$_2$O$_3$ are used in an indirect gasification reaction, and the carbonaceous fuel is indirectly gasified by:
      reducing the Fe$_2$O$_3$ containing particles with the carbonaceous fuel in a first reaction zone comprising a packed moving bed with a countercurrent gas-solids contacting pattern such that an average valence of iron is less than 1, wherein the first reaction zone is operated at a temperature of greater than or equal to 400° C. and less than or equal to 1200° C. and at a pressure of greater than or equal to 1.01×10$^5$ Pa and less than or equal to 8.10×10$^6$ Pa;
      at least partially oxidizing a portion of the reduced iron oxide containing particles from the first reaction zone with steam to generate a hydrogen rich gas in a second reaction zone comprising countercurrent gas-solids contacting pattern such that the iron oxide containing particle is at least partially oxidized to contain Fe$_3$O$_4$;
      directly sending a portion of the reduced iron oxide particles from the first reaction zone to a third reaction zone;
      oxidizing the reduced iron oxide particles from the first reaction zone and the iron oxide containing particles from the second reaction zone with an oxygen containing gas in the third reaction zone, and returning the oxidized iron oxide containing particles to the first reaction zone; and
   reacting the hydrogen rich gas and a portion of the carbon dioxide in a CO$_2$ hydrogenation reaction to form a synthetic fuel, wherein remaining CO$_2$ is sequestered.

2. A method as claimed in claim 1 in which at least a portion of the steam is produced using heat generated from the CO$_2$ hydrogenation reaction.

3. A method as claimed in claim 1 in which the carbonaceous fuel comprises syngas, carbon monoxide, methane rich gas, light hydrocarbons, liquid carbonaceous fuels, coal, biomass, tar sand, oil shale, petroleum coke, heavy liquid hydrocarbons, wax, or a mixture thereof.

4. A method as claimed in claim 1 in which at least a portion of the synthetic liquid fuel is used as a feed for the carbonaceous fuel.

5. A method as claimed in claim 1 in which the metal oxide particles contain supporting material comprising a ceramic material selected from the group consisting of oxides of Al, Ti, Zr, Y, Si, La, Cr, Mg, Mn, Cu, Ca, carbides of Si and Ti, sepiolite, bentonite, and kaolin.

6. A method as claimed in claim 1 in which gaseous species selected from $CO_2$, $H_2O$, or gaseous fuels from $CO_2$ hydrogenation, are introduced to the bottom of the first reaction zone to enhance conversions of both the iron oxide particles and the carbonaceous fuel.

7. A method as claimed in claim 1 in which the carbonaceous fuel comprises solid carbonaceous fuel particles which are suspended by the gases in a lower section of the first reaction zone until they are at least 50% converted before being elutriated towards the top of the first reaction zone.

8. A method as claimed in claim 1 in which a calcium oxide containing $CO_2$ sorbent is used to assist in the indirect gasification of the carbonaceous fuels.

* * * * *